O. CARGILL.
LIFTING DEVICE FOR MOTOR VEHICLES.
APPLICATION FILED JUNE 8, 1915.
1,220,397.
Patented Mar. 27, 1917.
2 SHEETS—SHEET 1.
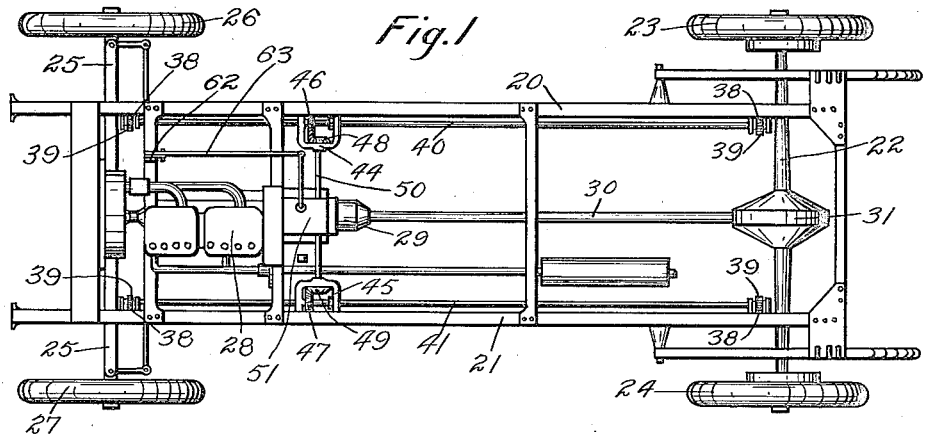
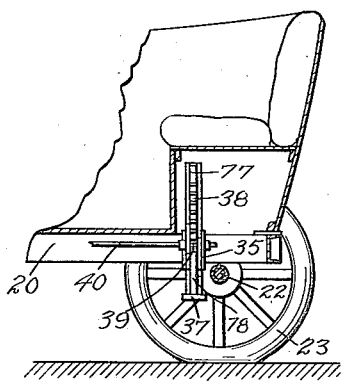
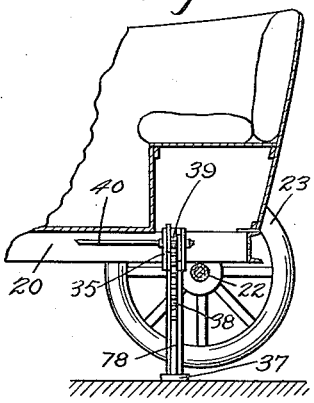
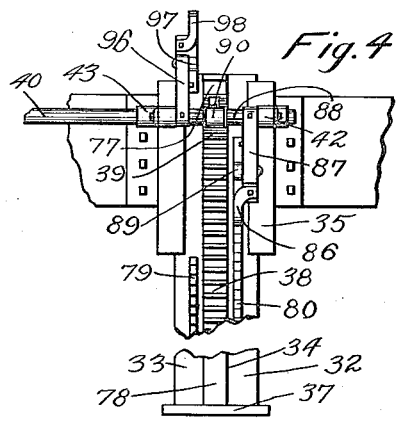
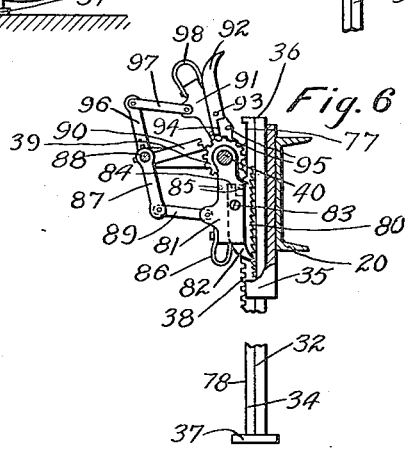
Witnesses:
Alex. Fagaard
H. A. Bowman
Inventor:
Oscar Cargill
By F. A. Whiteley
his Attorney.

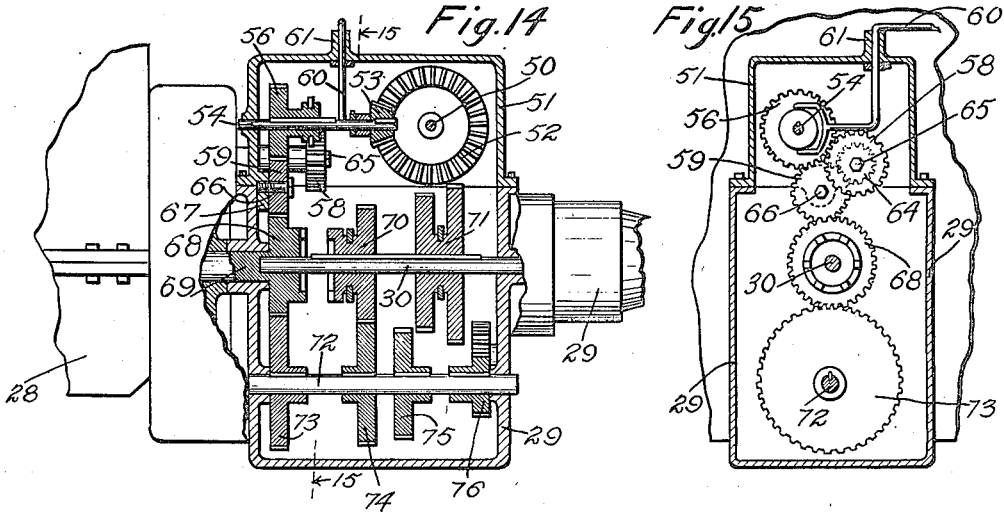
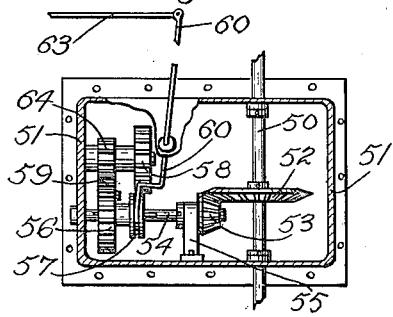
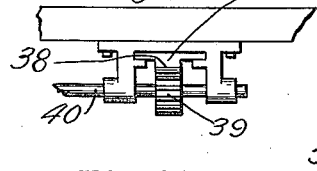
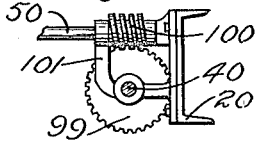

UNITED STATES PATENT OFFICE.

OSCAR CARGILL, OF MINNEAPOLIS, MINNESOTA.

LIFTING DEVICE FOR MOTOR-VEHICLES.

1,220,397.  Specification of Letters Patent.   Patented Mar. 27, 1917.

Application filed June 8, 1915. Serial No. 32,835.

*To all whom it may concern:*

Be it known that I, OSCAR CARGILL, a citizen of the United States, residing at Minneapolis, in the county of Hennepin and State of Minnesota, have invented certain new and useful Improvements in Lifting Devices for Motor-Vehicles, of which the following is a specification.

My invention relates to devices for lifting automobiles or other motor vehicles and has for its object to provide a plurality of members connected and movable with the car and adapted to be operated by the power of the car so to to cause said members to engage the ground and lift the car from the ground to hold it in elevated position for any desired period of time or to withdraw said members from their projected positions to permit the car to return to the ground and to position said members so as not to interfere with the normal operation of the vehicle.

In general, my invention employs preferably four lifting and supporting members or jacks which are connected with the frame of the vehicle, and in their elevated position are substantially concealed and in no way interfere with the operation of the car. These jacks are connected by a system of shafts and gearing with certain members of the transmission devices, a hand-operative clutching or connecting device acting to render such connections operative or inoperative, as desired, when the engine is running but not connected with the drive of the vehicle. If the aforesaid connections are rendered operative, the four jacks will be simultaneously projected downwardly where they will finally engage the ground and result in lifting the vehicle body and all four wheels clear of the ground, means being provided to terminate the lifting action when the wheels have been elevated to the proper height, and other means locking the jacks in this position. These locking means are unlocked upon reversal of the engine, which permits the vehicle to descend to the ground, and the jacks are thereafter elevated into inoperative position where they are held by other locking means.

The full objects and advantages of my invention will appear in connection with the detailed description thereof and are particularly pointed out in the claims.

In the drawings, illustrating the application of my invention in one form,—

Figure 1 is a plan view of an automobile chassis showing the location of the parts comprising my jacks. Fig. 2 is a side elevational section of the rear portion of an automobile showing the portion of one of the jacks when the same is raised out of the way. Fig. 3 is a similar view of the same portion of the automobile and jack shown in Fig. 2, with the jack lowered and the automobile raised. Fig. 4 is an enlarged detail side view of some of the parts as shown in Fig. 3. Fig. 5 is an enlarged detail plan view of the parts shown in Fig. 4, and Fig. 6 is a rear end view of the same parts, some of which are cut away and shown in section. Fig. 7 is an enlarged detail rear end view of the parts shown in Fig. 2, when the jack is in the position shown in Fig. 2, and is similar to Fig. 6. Fig. 8 is an enlarged plan view of the right angled drive shown in Fig. 1, and Figs. 9 and 10 are enlarged side and rear end elevational views, respectively, of the same. Fig. 11 is a view, corresponding to Fig. 10, of a modification of the parts there shown. Fig. 12 is a view, corresponding to Fig. 5, of a modification of the parts there shown. Fig. 13 is an enlarged plan view of the gearing used for transmitting power to the jacks, having part of the top of the casing removed to show the parts within. Fig. 14 is an enlarged sectional side view of the parts shown in Fig. 13 with the addition of the automobile transmission box showing the manner of procuring power from the drive gear on the engine crankshaft. Fig. 15 is an enlarged rear end section of the parts shown in Fig. 14, on line 15—15 of Fig. 14.

An automobile of the ordinary type, to which my invention may be attached, is shown in Fig. 1. A frame comprising side members 20 and 21 is supported on a rear axle 22 carrying wheels 23 and 24, and upon a front axle 25 carrying wheels 26 and 27 in the usual manner. An engine 28 is located at the front of the automobile and is in communication with an adjacent transmission box 29 from which issues a drive shaft 30 communicating with the differential gear case 31 located on the rear axle 22. The drive shaft 30, which is loosely journaled in the transmission box 29, the end of crankshaft 69 to which is rigidly attached drive gear 68, the shift gears 70 and 71 in conjunction with the shaft 72 and the gears 73, 74, 75 and 76 thereon, form the transmission system of the automobile which is of the three-speed selective type.

My invention comprises four lifting members or jacks situated in the four corners of the automobile, within the frame members 20 and 21 and the axles 22 and 25, identical in construction and operation, and of which the jack situated in the corner formed by frame member 20 and rear axle 22 is shown in detail in Figs. 2, 3, 4, 5, 6 and 7. In reference to the said jack, a T-shaped standard 36, of which 32 and 33 are the wings and 34 is the body, slides vertically in a slotted casting 35 bolted to the frame member 20. The standard 36 is supplied with a foot 37 which engages with the ground when the automobile is raised, as seen in Fig. 3, the upper portion of said standard being withdrawn up under the seat or hood when the jack is not in use, as seen in Fig. 2.

The standards 36 are supplied with racks 38 located on the body 34 of the same. They are operated by pinions 39 meshing with said racks, and rigidly secured to the four ends of shafts 40 and 41, said shafts running longitudinally along the insides of frame members 20 and 21, respectively, and journaled in arms 42 and 43 projecting from castings 35, and in the U-brackets 44 and 45 attached to the same frame members 20 and 21. Shafts 40 and 41 have attached thereto bevel gears 46 and 47 which mesh with the bevel gears 48 and 49 rigidly attached to the ends of a transverse shaft 50, which shaft is also journaled in U-arms 44 and 45. In the style of automobile shown where the cover on the transmission box comes on the top, I employ a modified cover 51, in the form of an inverted box-like casing containing the necessary means for actuating shaft 50. The shaft 50 is also journaled in the sides of box 51 and passes directly through the same. Within the box 51, a bevel gear 52 rigidly attached to shaft 50 meshes with a bevel gear 53 rigidly attached to the end of a longitudinal shaft 54, said shaft 54 being journaled in the end of box 51 and in a bracket 55 extending from the side of the same. Shaft 54 has splined thereto a gear 56 provided with a shifting collar 57, said gear being able to mesh with either of gears 58 or 59 at will by means of a forked bell-crank 60 passing through the top of box 51 and pivoted in a lug 61 projecting from the same, said forked bell-crank 60 engaging with shifting collar 57. The said forked bell-crank is pivotally connected with a hand lever 62 by means of a connecting link 63. Gear 58 is rigidly attached to a gear 64 and spaced therefrom, and both gears are mounted on a stub shaft 65 screwed to the end of box 51. Gear 64 meshes with gear 59, and said gear 59, which is mounted on a similar stub shaft 66 screwed to a lug 67 projecting downwardly from the end of box 51, meshes with the main drive gear 68 of the automobile, which is rigidly connected to the crankshaft 69 of the engine 28. Gear 56 does not run when it is in the space between gears 58 and 64, and runs in one direction when in mesh with gear 59 and in the other direction when in mesh with gear 58. Gear 64 is of such a size that gear 56 does not interfere with it when the same is in mesh with gear 59. When the transmission box 29 is some distance from the engine 28 gear 66 is coupled directly to the crankshaft 69. When necessity requires it gear 66 can be driven from any of the gears on shaft 72.

The raising and lowering motion imparted to the standards 36 through the racks 38 and the pinions 39 is terminated by means of blank spaces 77 and 78 in the racks 38 at the tops and bottoms of the said standards. When the pinions 39 reach these spaces they revolve without further raising or lowering the jacks, and so terminate the motion thereof.

The means for locking the jacks when the same have been elevated or lowered and when the power is not applied thereto is as follows: Each standard 36, of which the one located in the rear right hand corner of the automobile is shown in Figs. 2, 3, 4, 5, 6, and 7 is provided with two ratchet bars 79 and 80, bar 79 being secured to the lower portion of wing 33 and having its teeth extending downward to allow only upward motion of standard 36, and bar 80 being secured to the upper portion of wing 32 with its teeth pointing upward to allow only downward motion of said standard. A carrier arm 81 supporting pawl 82 pivoted at 83 oscillates loosely on shaft 40. An extension 84 on pawl 82 moves between pegs 85 on carrier arm 81 to limit the motion of said pawl. Pawl 82 engages with ratchet bar 80 and is pressed against the same by spring 86 on carrier arm 81. Carrier arm 81 is pivotally connected by means of a link 89 to a bell-crank arm 87 rigidly fastened to a shaft 88. Shaft 88 is journaled in the previously mentioned brackets 42 and 43 and also carries the toothed finger 90 which meshes with pinion 39, and is situated at right angles to the arm 87. When pinion 39 is revolving to cause standard 36 to travel downward, finger 90 revolves with pinion 39 till it gets above and free from said pinion, and bell-crank arm 87 throws the carrier arm 81 toward wing 32, causing the pawl 82 to come in contact with the ratchet 80. As pinion 39 revolves, the bell-crank lever and ratchet mechanism remain in the position shown in Fig. 6, and pawl 82 allows the teeth of ratchet 80 to escape as the standard 36 passes downward till the pinion 39 reaches the blank space 77 of the rack. Said pawl holds the standard locked at such a point that the power may be shut off as the automobile is in the elevated position shown in Figs. 6 and 3. Another carrier arm 91 loosely pivoted on shaft 40 carries a similar pawl 92 pivoted to said carrier arm at 93, and limited in motion by lug 94 on said pawl 92 and pegs 95 on said arm 91. Carrier arm 91 is pivotally connected by a connecting link 97 to a bell-crank arm 96 rigidly fastened to shaft 88 and at right angles to finger 90. Pawl 92 is pressed toward wing 33 by a spring 98 fastened to carrier arm 91 and engages with ratchet bar 79. When the automobile is raised, pawl 92 is disengaged from ratchet 79 and the attached mechanism is located as shown in Fig. 6. If it is now desired to lower the automobile, the pinion 39 is caused to rotate in a direction tending to raise the standard 36. The spring 86 pressing against the carrier arm 81 and the pawl 82 causes the toothed finger 90 to engage with pinion 39, and the same is rotated down and below and free from the pinion 39, shifting crank arms 96 and 87 and carrier arms 91 and 81 to the positions shown in Fig. 7. When pawl 82 is withdrawn from ratchet 80, the weight of the automobile causes rack 38 to mesh with pinion 39, and the pawl 92 lets the teeth of ratchet 79 escape while the standards 36 are traveling upward. As soon as pinions 39 reach the blank space 78 on rack 38 it ceases to raise standards 36, and pawls 92 hold the same in place when the jack is not in use.

A modified form of my invention is shown in Figs. 11 and 12. The bevel gears 46, 47, 48 and 49 are replaced by the worm wheels 99 fastened to the ends of shaft 50 and the worm gears 100 fastened to shafts 40 and 41, and U-brackets 44 and 45 are replaced by similar U-brackets 101. The ratchet and lever mechanism shown in Fig. 6 is entirely dispensed with, as shown in Fig. 12, making the entire weight of the car rest upon the racks 38 and pinions 39, the locking of which is effected through the worm gears 100 and worm wheels 99.

The advantages of my invention will be apparent. The system of jacks is at all times immediately available for use. If it is necessary to lift the automobile for repairs, to apply a new tire or for any other purpose, the operator can, immediately upon stopping the same, cause it to be lifted to the desired height where it can be held until the repairs are completed. It will also be practicable to have the automobile supported by the jacks at all times when not in use, thus taking all strain off of the tires. It is well known that when an automobile, particularly the heavier type of cars, is left for any considerable period of time in one position, the weight upon the tires tends to deform the substance of the tires at the points of contact with the ground or floor. Such deformed portion of the tire will later in use be subjected to greater shock than other parts of the tire and becomes weakened and ultimately gives away. It follows that if the automobile is supported with the tires free from the ground when not running, the life of the tires will be greatly prolonged; and the simple and efficient accomplishment of this result is one of the chief advantages of my invention.

I claim:

1. In combination with the frame and engine of a motor vehicle, a casing adapted to be secured to the transmission casing of said engine in place of the cap, transmission gears within said casing meshing with the engine shaft drive gear, said transmission gears including a reversing mechanism, a plurality of lifting devices situated at the corners of the frame and operable from said transmission gears, and means for operating said transmission gears.

2. In combination with the frame of a motor vehicle, a plurality of lifting devices connected with said frame and adapted to be moved relatively thereto, means for actuating said lifting devices to cause them to be moved in either an upward or downward direction, means for locking said devices from movement in a direction opposite to that imparted to them by the actuating means, means for reversing the direction of movement of the devices, and means for reversing the action of the locking means.

3. In combination with the frame and engine of a motor vehicle, a plurality of lifting devices connected with said frame and adapted to be moved relatively thereto, means including pinions operated by said engine for actuating said lifting devices, means for locking said lifting devices against movement opposite to that imparted to them by said actuating means, and means operable by said pinions for reversing the action of said locking means.

4. In combination with the frame of a motor vehicle, a plurality of lifting devices, each device comprising a T-shaped bar, a rack on the stem of said bar and ratchets on the arms of said bar, a pinion meshing with said rack for operating said device, and dogs engageable with said ratchets for locking said device.

5. In combination with the frame of a motor vehicle, a plurality of lifting devices, each device comprising a T-shaped bar, a rack on the stem of said bar, oppositely-extending ratchets on the arms of said bar, a pinion meshing with said rack for operating said device, arms pivoted to said frame, dogs on said arms engageable with said ratchets for locking said device, links connecting said arms so that only one of said dogs engages its corresponding ratchet at one time, and a finger engageable with said pinion for operating said links.

6. In combination with the frame of a motor vehicle, a plurality of lifting devices connected with said frame and adapted to be moved relatively thereto, means for simultaneously moving all said lifting devices to cause the same to engage the ground and raise the vehicle from the ground, means for locking the devices in moved position after the automobile has been raised, and means for simultaneously unlocking said members and restoring them to original position to return the vehicle to the ground.

7. In combination with the frame and engine of a motor vehicle, a system of lifting devices connected therewith, means operable by the engine of the motor vehicle for actuating said lifting devices, means for automatically terminating said actuation and for locking the lifting devices in position to hold the vehicle off the ground, and means operable by the engine for unlocking said locking means and restoring the lifting devices to initial position.

8. In combination with the frame and engine of a motor vehicle, a casing adapted to be secured to the transmission casing of said engine in place of the cap, transmission gears within said casing meshing with the engine shaft drive gear, said transmission gears including a reversing mechanism, an operating lever extending from said casing into the engine hood, and a plurality of lifting devices situated at the corners of the frame and operable from said transmission gears.

In testimony whereof I affix my signature in presence of two witnesses.

OSCAR CARGILL.

Witnesses:
F. A. WHITELEY,
H. A. BOWMAN.